Patented Jan. 28, 1941

2,230,062

UNITED STATES PATENT OFFICE 2,230,062

MEAT PROCESSING

Isaac N. Jordan, Chicago, Ill.

No Drawing. Application May 29, 1939,
Serial No. 276,454

10 Claims. (Cl. 99—187)

This invention relates to the processing of comminuted meat products. More particularly it relates to processes wherein comminuted meats which are to be packed in cans are suitably mixed with salt, spices, etc., and the mixture then cured at temperatures lower than have heretofore been used, the mixture being again subjected to a mixing operation and finally stuffed into cans.

The invention also relates to processes for preparing sterile canned meat products wherein the ground meat is first suitably processed employing low curing temperatures, remixed, and then sterilized under pressure, the pressure preferably being maintained during the time the meat is in heated condition.

There is a very wide demand in the consumer trade for so-called luncheon meats. These products comprise ground meat, such as beef, ham, other pork products and mixtures thereof, together with flavor-imparting and curing ingredients, such as salt and spices. Many difficulties are encountered in preparing and packaging such meat mixtures in cans. Undesirable separation of meat juices commonly occurs in the can after packaging. This separation amounts to about 8% to 12% of the can contents and also results in the meat product undergoing considerable shrinkage giving a product which is not very satisfactory to the trade. Because of the high shrinkage due to separation of meat juices in the can the meat loaf becomes dense, tough and unpalatable.

In the conventional methods now employed for preparing this type of product it is necessary to trim the meat closely and remove substantially all of the fat before grinding. It has been necessary to do this because if the fat were not so removed, it would separate out in the can along with additional meat juices and make an altogether unsatisfactory product. In the first place the trimming of the meat in this fashion is very wasteful and yields a large amount of fat which must be disposed of at a greatly reduced price. In the second place the removal of this fat takes away from the meat one of the factors which can serve to render it tender and palatable if such could be retained in the meat mass. These objections to the former methods of canning these loaf type meats have in the past presented serious problems.

The customary methods of preparing luncheon meats, or so-called meat loafs, consist in grinding the meat through an ordinary sausage grinder after which the meat is mixed with salt and spices in a mechanical mixer, packed into tierces, and cured for three to five days at curing cellar temperatures of about 36° to 38° F. More recently the curing step has been entirely omitted in which case the mixture of ground meat, salts and spices are immediately stuffed into cans and the canned product cooked at a temperature of about 150° to 160° F. for a period of about four to six hours. The product, as a result of the cooking, meets the standards set out by the Bureau of Animal Industry with respect to trichina. The above procedure has, for several years, been the standard practice throughout the meat-packing industry. The product, however, is not sterile and all cans carry the label "Perishable, keep under refrigeration."

As stated, in the above process the meat must be well trimmed of fat or considerable shrinkage with separation of meat juices inevitably occurs.

The present invention has for its object improving processes of preparing such ground meat products to be sold in cans to the end that larger amounts of fats may be kept in the product while at the same time preventing shrinkage and separation of meat juices. By the present invention, I am able to prepare a packed meat loaf which has a fat content of 15% to 20% more than the fat content hitherto considered permissible in such loafs and am able to maintain the shrinkage to an insignificant amount. One of the largest advantages from an economic point of view resides in the higher fat content which can be maintained. This higher content greatly increases the appearance and palatability of the meat product.

The process of the present invention includes a curing operation at temperatures much lower than hitherto used, together with a remixing step interposed between the curing operation and the packing operation. When these essentials are observed the markedly improved results of my invention are obtained.

I shall now describe my invention in greater detail.

When preparing an ordinary luncheon meat the meat trimmings customarily forming the meat portion of such products are first ground through a standard meat grinder or otherwise comminuted in any suitable way and the comminuted material placed in a mechanical mixer. These meat trimmings, however, need not be as closely trimmed as in the past. Spices and salts are then added in the customary way and in proportions used in this art. The quantities thereof depend upon the amount of flavoring desired in the final product and such proportions are no part of the present invention. The ingredients are then mixed, preferably in a vacuum mixer, also commonly used in the art, for a period of about ten minutes. Then the product is withdrawn, packed into tierces, vats, trucks or other suitable containers, and transferred to a curing cellar for curing. As noted above, such meat products have hitherto been cured at temperatures of 36° to 38° F. My process departs from prior practice at this point since I have found it necessary to cure at temperatures below 30° F., and preferably in the range of 22° to 26° F. The curing time is about three to five days.

At the conclusion of the curing period the product is removed from the curing containers and replaced in a mechanical mixer for remixing. Here again it is best to use a vacuum mixer and the product is mixed therein for about five minutes. The remixed product is then packed into tins of suitable size, and given the usual cooking treatment which may be subjecting the canned meat to a temperature of about 150° or 160° F. for something like 4 to 6 hours, after which it may be distributed to the trade.

Though in this improved process the ground meat contains 15% to 20% more fat than has heretofore been used, the separation of fats and meat juices in the can is equivalent to only a very insignificant amount, usually less than 2 ounces in a 6 pound loaf. Had the product containing this amount of fat been prepared by simply grinding, mixing, packing in the can and heating in the regular way, the shrinkage would have amounted to about 8% to 12%. Thus, the improved process has effected very substantially the separation of the fat from the meat and has enabled a superior product. The 15% to 20% increased amount of fat which this process enables may be supplied either by failing to trim the fat as closely before grinding or by deliberately adding an extra amount of fat. The low shrinkage and the ability to hold large quantities of fat are attributed to the curing conditions I use and remixing step subsequent to the curing operations.

I am not able to explain the theory by which these curing and remixing steps yield the improved results here obtained, but must content myself with the observation of their effect. Peculiarly, I find that the large amount of shrinkage formerly obtained when greater proportions of fat were used was not due altogether to the separation of fat from the meat but that the fat must in some way have affected the separation of natural juices from the meat. The steps of curing at lower temperatures together with remixing operates in some way to prevent this effect of the excess fat in separating out the natural meat juices.

When it is desired to produce a sterile canned meat product, and this is in many cases desirable to eliminate the necessity of refrigeration, I proceed to prepare the canned meat product as above described except that in this procedure it is best to trim the meat somewhat more closely than in the case of the improved non-sterile product. This is probably because the meat must subsequently be subjected to higher temperatures in the sterilizing operation. In preparing this sterile product the ground spiced meat is cured at temperatures below 30° F. and preferably 22° to 26° F., remixed, packed into tins and sealed under vacuum, after which it is ready for the sterilization treatment.

In sterilizing I have found that if the cans containing the meat prepared as above described are maintained under a pressure of about ten or twelve pounds per square inch during the heating, that the shrinkage of the sterile product is very substantially decreased, and this factor works along with the curing and remixing steps to produce a superior product.

One way of carrying out the improved sterilization step is to immerse the sealed cans in water contained in a closed retort. The water may suitably be heated by steam and an internal pressure maintained within the retort by means of compressed air. Good results are obtained when a temperature of about 225° F. is maintained for about an hour under a pressure of from ten to twelve pounds per square inch when 12 ounce packages are being processed. These conditions are subject to variation and lower temperatures may be used for longer times, and higher temperatures may be employed for shorter periods of time.

At the end of the sterilizing period cold water is admitted to the sterilizing retort while the air pressure is maintained constant. After about thirty minutes' chilling in cold water the air pressure is then released and the product removed from the sterilizer. I prefer to cool the cans and their contents from the sterilizing temperature down to a temperature of around 130° or 140° F. while maintaining the cans still under pressure since I have found that this improves the product.

Though the pressure be maintained in the sterilizing operation I find that this does not produce the improved result except that the product is first subjected to the improved curing conditions and remixing step, and particularly the remixing step; and when the product is heated to sterilization temperature though it has been cured under the improved conditions and remixed, the advantage of these steps is not obtained in a substantial way except that the pressure be maintained during the heating.

In the usual way of preparing the sterile product in which the usual curing temperatures and cooking pressures are employed the fat and meat juice separation will normally run about 35% to 40%, while in the improved process herein set forth this separation will in most cases be less than 8%.

The foregoing detailed description has been given for purposes of explanation only, and it is expected that many changes may be effected in the details of the procedures without departing from the spirit of the invention.

Having thus described my invention, what I claim is:

1. In the processing of comminuted meat products to form meat loafs packed in containers, the steps which include curing the comminuted meat mixture at a temperature below 30° F., and remixing the cured mixture prior to packaging.

2. In the processing of comminuted meat products to form meat loafs packed in containers, the steps which include curing the comminuted meat mixture at a temperature of about 22–26° F. and remixing the cured mixture prior to packaging.

3. A process for preparing comminuted meat products in canned form comprising curing the comminuted meat at a temperature below 30° F. and thereafter subjecting said meat to mechanical agitation.

4. In the processing of comminuted meat products to form meat loafs packed into containers the step of curing the comminuted meat for at least three days at a temperature ranging from 22° F. to 26° F., and thereafter subjecting the meat to mechanical agitation.

5. A process for preparing sterile comminuted meat products in canned form comprising curing the comminuted meat at temperatures below 30° F., mixing the cured meat, and subjecting the mixed meat to sterilizing conditions in containers while maintaining said containers to a pressure greater than atmospheric pressure.

6. A process as set forth in claim 5 wherein said pressure is approximately ten to twelve pounds per square inch.

7. A process for preparing sterile comminuted meat products in canned form comprising curing the comminuted meat at a temperature below 30° F., subjecting the cured meat to mechanical agitation, and then heating said meat in containers to a temperature and for a sufficient length of time to sterilize the meat while maintaining the meat under a pressure greater than atmospheric pressure.

8. A process as set forth in claim 7 in which said pressure is maintained until the sterilizing operation is completed and said temperature of the meat is reduced below sterilizing temperature under the conditions of the process.

9. The process as in claim 7 wherein the meat is sterilized at a temperature of about 225° F. under pressure, and after the sterilizing is completed the pressure is maintained while the meat cools.

10. The process as in claim 7 wherein the meat is sterilized at a temperature of about 225° F. under pressure and, after sterilization is completed, the meat is allowed to cool down to a temperature of about 130° F. to 140° F. while still under pressure.

ISAAC N. JORDAN.